2,832,716
ACARICIDAL COMPOSITION OF A CHLOROALKYL ARYL OXYALKYL SULFITE WITH A DRY INERT POWDERED CARRIER STABILIZED WITH A PROPYLENE GLYCOL

Carroll C. Cassil, Berkeley, and Jerome Yaffe, El Cerrito, Calif., assignors to Food Machinery and Chemical Corporation, San Jose, Calif.

No Drawing. Continuation of application Serial No. 329,455, January 2, 1953. This application February 18, 1957, Serial No. 640,628

5 Claims. (Cl. 167—42)

The present invention relates to an acaricidal dust and, more particularly, to an acaricidal dust containing as the active ingredient, chloroalkyl aryl oxyalkyl sulfites, specifically beta chloro-ethyl beta(p-tertiary-butyl phenoxy) alpha-methyl ethyl sulfite, wherein a polyhydric aliphatic alcohol is incorporated to stabilize the active ingredient against decomposition.

This application is a continuation of Serial No. 329,455, filed the 2nd day of January 1953, now abandoned.

The problem of controlling mites infesting certain types of plants presents a rather difficult and specific problem by reason of the fact that the life cycle of the mite is relatively short. Specific acaricides are required for controlling mites since it is extremely desirable to have toxic action not only against the mite but also against the ova. Many of the well known and recently employed insecticides appear not to have specific action, for instance against the red spider mite and, in fact, certain of the highly publicized insecticides encourage the development of an infestation.

The chloroalkyl aryl oxyalkyl sulfites, however, appear to have rather specific characteristics as acaricides. They are the di-esters of sulfurous acid, wherein one of the esterifying groups is chloroalkyl radical containing 2 to 4 carbon atoms and 1 to 3 chlorine atoms and having no chlorine atom attached to the alpha carbon atom; the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is a radical having 2 to 4 carbon atoms. These compounds are specifically described in Harris et al. U. S. Patent 2,529,494 of November 14, 1950.

Although the chloroalkyl alkoxy alkyl sulfites are excellent specifics, for instance for red spider mites, dusts and dry wettable powder formulations containing these sulfite esters appear to lose potency with time as their physiologic activity definitely decreases upon storage, especially at elevated temperatures. In other respects, the sulfite esters are extremely desirable specifics as they have no adverse phytotoxic action when dusted upon foliage.

While it is not definitely known why the physiologic activity decreases when decomposition once begins, the rate of decomposition apparently proceeds exponentially. It is believed that the decomposition is probably hydrolytic, wherein sulfur dioxide is one of the hydrolytic products, the sulfur dioxide producing an acidic environment in the carrier by reason of the small amount of moisture always associated therewith, whereby constantly to reduce the pH in the dust or dry wettable powder, thus accelerating the hydrolysis of the active ingredient carried in the finely ground extender or carrier.

It is an object of the present invention to provide means for stabilizing wettable powders and dust formulations of chloroalkyl alkoxy alkyl sulfites against degradation of the active ingredient thereof.

It is an object of the invention to incorporate a polyhydric aliphatic alcohol as a stabilizer in wettable powders and dust formulations containing chloroalkyl aryl oxyalkyl sulfites.

It is, therefore, an object of the present invention to provide a more effective wettable powder and dust formulation whereby to carry chloroalkyl aryl oxyalkyl sulfites.

In accordance with the principles of the present invention, therefore, a chloroalkyl aryl oxyalkyl sulfite is preferably included in a polyhydric aliphatic alcohol and then mixed or blended with the dust in which the active acaricide is to be carried, although the order of mixing is not the essence of the invention. Generally, however, the dust formulation will be prepared by first mixing the sulfite ester with the polyhydric aliphatic alcohol and subsequently including that mixture in the dust diluent.

The carrier may be any of the normally employed dust carriers, either of the inorganic type or organic type. Thus, in either dust or wettable powders containing the sulfite ester as active ingredient, there may be employed as carrier or diluent, clay, silica gel, diatomaceous earth, fuller's earth, pyrophyllite, magnesium carbonate, tricalcium phosphate, plaster of Paris, ground gypsum and ground combinations of calcined gypsum and diatomaceous earth. The organic carriers include ground walnut hulls, wood flour, as for instance redwood flour, and the like. The combinations of calcined calcium sulfate and diatomaceous earth produce excellent dust formulations possessing the desirable characteristics of flowability and dustability, permitting great ease of handling and application, and also permitting better underleaf coverage, and consequently, both quicker and better kills of the mites.

When preparing a dry wettable powder, the content of active ingredient will generally be from about 5% to 30%, depending upon the application rate employed and upon the specific Acarina to be controlled. In general, the dry wettable powder will contain from 12 to 20% of active ingredient, the remainder being the carrier.

Where the dust is to be used for direct application, the amount of active ingredient is somewhat less than in the dry-wettable powder and will range from ½% to about 8%. For most applications, the amount of active ingredient is somewhat less than in the dry-wettable powder and will range from ½% to about 8%. For most applications for the control of Acarina, 2% to 4% of the active ingredient is quite suitable.

In order materially to decrease the decomposition rate of the sulfite ester, a polyhydric alcohol such as a glycol, is added to the dust and the dry-wettable powder in order to prolong the shelf life of the mixture. This is particularly necessary where other active additives are included with the sulfite ester in the ultimate formulation.

In accordance with the principles of the present invention, therefore, the polyhydric alcohol is incorporated in either a dry-wettable powder or a dust for direct application where either of these materials contain a sulfite ester as the active ingredient. The polyhydric aliphatic alcohol is included in an amount depending upon the quantity of sulfite ester included, the type of diluent dust and the approximate period of time it is desired to impart shelf stability to the complete formulation. Based upon the total formulation, the quantity of polyhydroxy aliphatic alcohol, as for instance glycol, included is from about 0.1% to 10%. It will be found, however, that suitable results upon a commercial scale with the production of desired shelf stability is obtainable by including from 1% to 6%. The resultant product will be found sufficiently effective to impart shelf stability over a normal storage period and to prevent excessive decomposition of the sulfite ester.

Where it is desired to impart general insecticidal characteristics in addition to the specific acaricidal action, the formulation may be supplemented by such additives as sulfur, fused bentonite sulfur, DDT, that is, 2,2-bis(p-chloro-phenyl)-1,1,1-trichloroethane; toxaphene, that is chlorinated camphene $C_{10}H_{10}Cl_8$; methoxychlor, that is, 2,2 - bis(p-methoxy-phenyl)-1,1-trichloroethane; aldrin, that is, $C_{12}H_8Cl_6$; dieldrin, that is $C_{12}H_8Cl_6O_1$, as well as other insecticides which broaden and enhance the final properties of the completed formulation. It has been found that the shelf life of formulations with such additives has been particularly short and it is very necessary in such formulations to find some means for improving the stability of them.

In manufacturing the ultimate formulation, it will generally be found preferable, as previously stated, to incorporate the sulfite ester with the polyhydric aliphatic alcohol first, and then blend this material as an additive to the dust carrier of the types mentioned above. However, no particular advantage can be found in increased potency or increased stability or increased shelf life by reason of this procedure as comparable acaricidal activity is obtained where the ingredients are blended with the ground carrier in the usual fashion, provided only, however that the method of mixing and blending produces uniform distribution of the active ingredient and stabilizer throughout the carrier. Such blending methods are well known in the formation of dusts and dry-wettable powder.

In the examples given below, the experimental results were obtained upon the specific sulfite ester, beta-chloroethyl-beta(p-tertiary-butyl phenoxy) aliphatic ethyl sulfite, known as "Aramite," although it will be understood that similar results are obtainable with the sulfite esters generally.

The experimental results are given as illustrative of the invention rather than limitative thereof. The content of active ingredient was determined by analytical chemical procedures. In general, the formulations were prepared, placed in containers and the containers stored at a constant temperature of 50° C. for stated periods of time and then chemically tested to determine the amount of active ingredient remaining in the formulation. In general, the diluent employed was a clay of the Attapulgus type, soapstone, magnesium carbonate or calcium sulfate mixed with diatomaceous earth.

In the tables below, the ground carriers are as follows: A—clay of the Attapulgus type; K—fused bentonite sulfur; M—magnesium carbonate; P—tricalcium phosphate; S—soapstone; T—talc; CD—calcined calcium sulfate and diatomaceous earth, 90% anhydrous calcium sulfate and 10% diatomaceous earth, by weight.

TABLE 1

Effect of polyhydric alcohol on stability in wettable power at 50° C. of beta-chloroethyl-beta (p-tert-butylphenoxy)-alpha-methyl ethyl sulfite

| Test No. | Percent Aramite | Diluent | Stabilizer | Stabilizer, percent | Days Tested | Percent Decomp. |
|---|---|---|---|---|---|---|
| 1 | 17.0 | A | None | | 25 | 67.11 |
| 2 | 17.0 | A—S | do | | 25 | 88.54 |
| 3 | 17.0 | A—M | do | | 25 | 72.85 |
| 4 | 17.0 | A | Glycerine | 5.0 | 21 | 2.33 |
| 5 | 17.0 | A | Dipropylene Glycol | 6.0 | 25 | 1.47 |
| 6 | 17.0 | A | do | 4.0 | 25 | 3.30 |
| 7 | 17.0 | A | do | 2.0 | 25 | 0.47 |
| 8 | 17.0 | A | 1.3 Butylene Glycol | 5.0 | 25 | 1.29 |
| 9 | 17.0 | A | 2.3 Butylene Glycol | 5.0 | 25 | 0.65 |
| 10 | 17.0 | A | Ethylene Glycol | 5.0 | 25 | 6.42 |
| 11 | 17.0 | A | Diethylene Glycol | 5.0 | 25 | 5.77 |
| 12 | 17.0 | A | Polypropylene Glycol | 5.0 | 25 | 6.37 |
| 13 | 17.0 | A | {Polypropylene Glycol-2025. Propylene oxide | 3.0 1.5 | | 2.38 |
| 14 | 17.0 | A | Polyethylene Glycol-400 | 3.0 | 25 | 4.83 |
| 15 | 17.0 | A | do | 6.0 | 25 | 3.42 |
| 16 | 17.0 | A—M | Propylene Glycol | .5 | 45 | 3.88 |

The stabilizing action of the polyhydric alcohol upon the decomposition of the sulfite ester in wettable powders is very strikingly shown in Table 1 about. Similar action is observable in dusting powders where, in general, the concentration of active ingredient is somewhat below that of the active ingredient in the dry wettable powder, i. e., on the order of 3 to 5% as against about 12–20%.

TABLE 2

Effect of polyhydric alcohol on stability in dust at 50° C. of sulfite ester

| Test No. | Percent Aramite | Diluent | Stabilizer | Stabilizer, percent | Days Tested | Percent Decomp. |
|---|---|---|---|---|---|---|
| 1 | 4.5 | P–T | None | | 31 | 54.75 |
| 2 | 4.5 | P–S | do | | 31 | 49.42 |
| 3 | 3.6 | P–T | do | | 23 | 71.00 |
| 4 | 3.5 | CD | do | | 31 | 45.80 |
| 5 | 4.5 | P–T | Dipropylene Glycol | 3.0 | 75 | 3.56 |
| 6 | 3.5 | CD | do | 1.0 | 50 | 3.71 |
| 7 | 3.5 | CD | do | 2.0 | 50 | 4.27 |
| 8 | 3.6 | S–A | do | 1.0 | 42 | 5.23 |
| 9 | 3.6 | S–A | do | 2.0 | 42 | 5.24 |
| 10 | 3.5 | S–M | {Polypropylene Glycol-2025. Propylene Oxide | 1.0 0.5 | 50 | 9.15 |
| 11 | 3.6 | CD–K | Dipropylene Glycol | 2.0 | 50 | 4.96 |

In the examples above, where polyethylene glycols and polypropylene glycols are employed, the average molecular weight of the glycol is included as part of the nomenclature. Thus polyethylene glycol–400 refers to a polyethylene glycol having an average molecular weight of 400, while polypropylene glycol–2025 refers to polypropylene glycol of average molecular weight of 2025.

What is claimed is:

1. An acaricidal composition containing a dry inert powdered carrier diluent and beta-chloroethyl-beta(p-tert-butylphenoxy)alpha-methyl ethyl sulfite as active ingredient and 0.1% to 10% of a propylene glycol as a stabilizer for the active ingredient.

2. Composition of claim 1 wherein the glycol is dipropylene glycol.

3. Composition of claim 1 wherein the glycol is a polypropylene glycol.

4. Composition of claim 1 wherein the glycol is propylene glycol.

5. An acaricidal composition containing a dry inert powdered carrier diluent and beta-chloroethyl-beta(p-tert-butylphenoxy)alpha-methyl ethyl sulfite as active ingredient and 0.1% to 10% of a dihydroxy aliphatic alcohol selected from the group of glycols consisting of ethylene glycol, butylene glycol, propylene glycol and polymers of ethylene glycol and propylene glycol.

References Cited in the file of this patent

UNITED STATES PATENTS

| | | |
|---|---|---|
| 2,075,845 | Gross | Apr. 6, 1937 |
| 2,193,873 | Jordan | Mar. 19, 1940 |
| 2,422,951 | Conant | June 24, 1947 |
| 2,468,423 | Berger | Apr. 26, 1949 |
| 2,529,494 | Harris | Nov. 14, 1950 |
| 2,641,563 | Moore | June 9, 1953 |
| 2,644,008 | Glenn | June 30, 1953 |

U. S. DEPARTMENT OF COMMERCE
PATENT OFFICE

CERTIFICATE OF CORRECTION

Patent No. 2,832,716     Carroll C. Cassil et al.     April 29, 1958

It is hereby certified that error appears in the printed specification of the above numbered patent requiring correction and that the said Letters Patent should read as corrected below.

Column 3, line 25, for "powder" read -- powders --; line 52, in the heading to Table 1, for "power", in italics, read -- powder -- in italics; same column 3, Table 1, fifth column thereof, last line, for "5" read -- 5. --; column 4, line 3, for "about" read -- above --.

Signed and sealed this 8th day of July 1958.

(SEAL)
Attest:
KARL H. AXLINE
Attesting Officer

ROBERT C. WATSON
Commissioner of Patents